United States Patent [19]

Stober et al.

[11] Patent Number: 5,051,290
[45] Date of Patent: Sep. 24, 1991

[54] FIRE BARRIER BLANKET

[75] Inventors: Donald Stober, Woodcliff Lake; Bill Williams, Harworth, both of N.J.

[73] Assignee: Mueller Belting and Specialty Co., Saddle Brook, N.J.

[21] Appl. No.: 443,119

[22] Filed: Nov. 29, 1989

[51] Int. Cl.$^5$ .......................... B32B 3/06; B32B 3/08
[52] U.S. Cl. ..................................... 428/81; 428/100; 428/307.3; 428/319.1; 428/920; 428/921; 428/194
[58] Field of Search ................... 428/99, 100, 81, 920, 428/921, 307.3, 319.1, 192, 194; 169/48

[56] References Cited

U.S. PATENT DOCUMENTS 4,822,659  4/1989  Anderson et al. .................... 428/99

Primary Examiner—Alexander S. Thomas
Attorney, Agent, or Firm—Richard T. Laughlin

[57] ABSTRACT

A fire barrier blanket for a splice portion of an electrical cable or conduit is provided. The blanket includes an elongate center portion having an elongate axis and axially spaced end portions connected to the cable and axially spaced clamp units such as a strap or a clamp urging the end portions in sealing engagement with the cable. The center portion and end portions each has an inner fiberglass layer and a middle silicone rubber foam layer and an outer fiberglass layer. The fiberglass layers each is silicone coated and is cast onto the middle foam layer on each side thereof. Opposite edges of the center portion have hook and loop type fastener strips which are sold under the trademark VELCRO or HOOK AND LOOP. In one embodiment for a relatively large diameter splice portion, each end portion has a pair of flap portions having diagonal edges. Adjacent diagonal edges have coacting hook and loop type fastener strips.

7 Claims, 2 Drawing Sheets

FIRE BARRIER BLANKET

The invention relates to a fire barrier blanket, and in particular the invention relates to a cable or conduit fire barrier blanket having cable wrapping means and having outer fiberglass layers with a middle foam rubber layer.

BACKGROUND OF THE INVENTION

The prior art cable fire barrier blanket is described in U.S. Pat. No. 4,822,659 issued Apr. 18, 1989. This blanket has a rectangular portion with lengthwise interlocking strips along two opposite lengthwise edges and has a first inner fiberglass layer with the strip and has a second adjacent insulating material layer and has a third adjacent fiberglass layer and has a fourth outer foam rubber layer.

One problem with the prior art cable fire barrier blanket is that it is relatively difficult to make a good connection between the blanket and an electrical cable or conduit. A second problem is that it is an expensive type of construction.

SUMMARY OF THE INVENTION

According to the present invention, a cable or conduit fire barrier blanket is provided. This blanket comprises an elongate center portion with an elongate axis, axially spaced end portions for forming connections to the cable or conduit; the end portions having respective clamp means for forming seals between the blanket end portions and the conduit, said center portion and end portions each having an inner fiberglass layer and an outer fiber glass layer and a middle foam rubber layer disposed between the fiberglass layers.

By using a relatively thin three-layer blanket and by using clamp means, a relatively tight circular seal can be made between the clamp means at its inner surface and the conduit at its outer surface, whereby the problem of the relative difficulty to make a secure connection between the blanket and an electrical cable, air brake lines or conduit is avoided.

The foregoing and other objects, features and advantages of the invention will be apparent from the following description of the preferred embodiments of the invention s illustrated in the accompanying drawings.

DESCRIPTION OF THE PREFERRED EMBODIMENT

Figure 1:
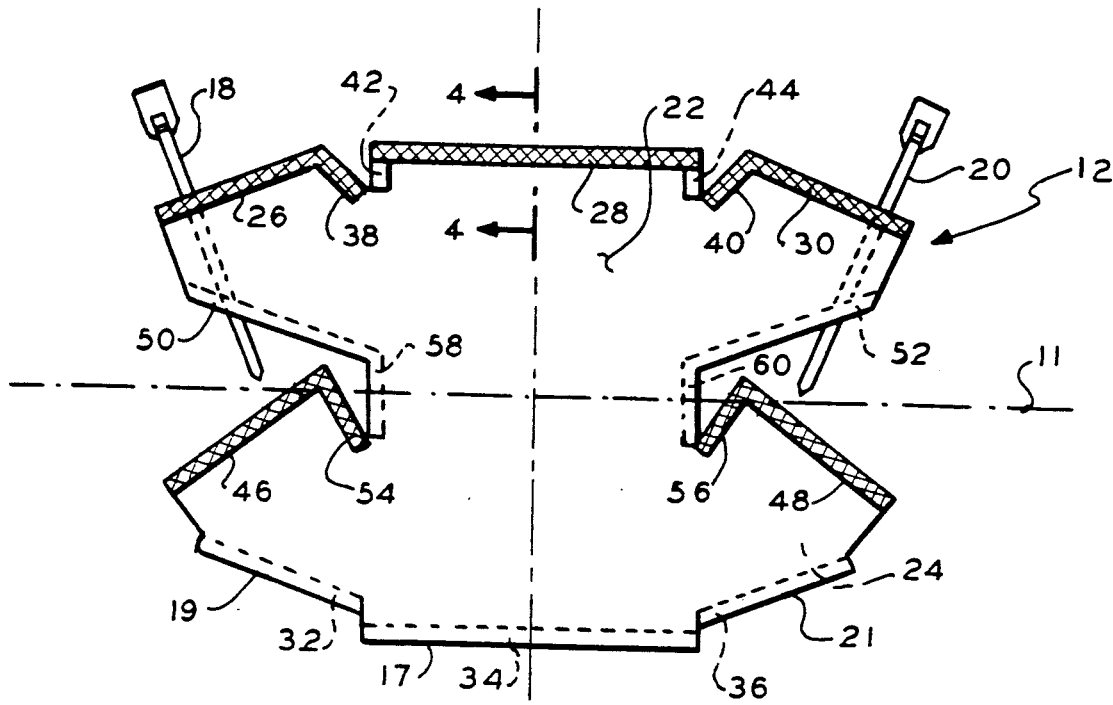
FIG. 1 is a developed plan view of an inner side of a fire barrier blanket according to the invention.
Figure 2:
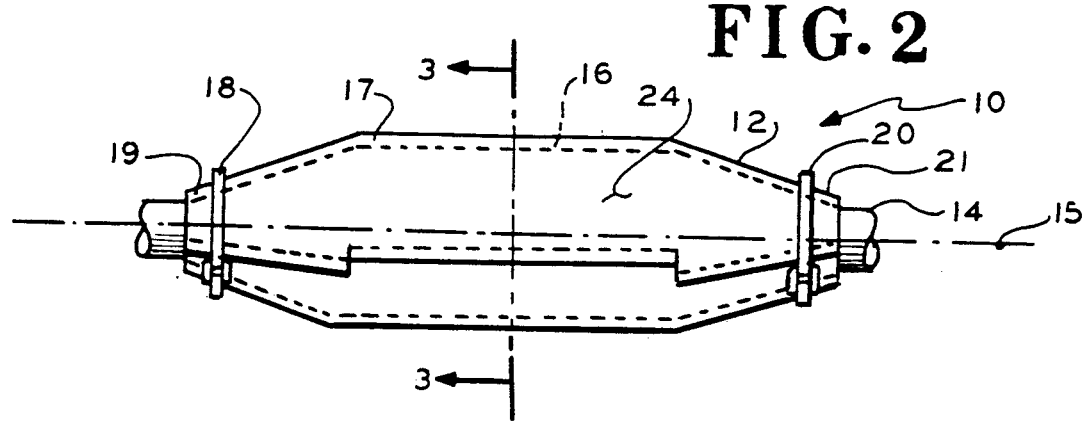
FIG. 2 is a plan view of the fire barrier blanket wrapped around a cable splice.

As shown in FIGS. 1 and 2, a fire barrier blanket 12 and an electrical cable or conduit 14 are provided. Before installation, when flat, the blanket has an axis of symmetry 11. After installation, assembly 10 includes blanket 12, and the cable 14 with its splice 16. Blanket 12, cable 14, and splice 16, are coaxial along a cable axis 15.

The blanket 12 has a left strap 18 and a right strap 20. The blanket 12 also has a center portion 17, a left end portion 19, and a right end portion 21. The end portions 19, 21 are axially spaced along cable axis 15. After assembly, the end portions 19, 21 each has a frustoconical shape. The straps 18, 20 are stitched to the blanket 12 at the lengthwise center portions thereof, so that straps 18, 20 are tightened down on the respective end portions 19, 21, and cable 14, thereby making substantially tight fit connections. Each of the end portion 19, 21 is cut to form two separate flaps, which when overlapped at their edges form a frusto-conical shape. Blanket 12 also has an inner side or face 22 and an outer side or face 24. Inner side 22 is shown in FIG. 1, and outer side 24 is shown in FIG. 2.

Corresponding edges of the blanket 12 have attachment strips as indicated hereafter for ease of forming and assembling blanket 12 on cable 14. Inner side 22 has three attachment strips 26, 28, 30; and outer side 24 respectively has corresponding or coacting strips 32, 34, 36. The inner side 22 has two strips 38, 40; and the outer side 24 has respective coacting strips 42, 44. The inner side 22 has strips 46, 48; and outer side 24 has coacting strips 50, 52. The inner side 22 has strips 54, 56; and outer side 24 has coacting strips 58, 60.

After assembly, strips 26, 28, 30 overlap and join respective strips 32, 34, 36. Strips 38, 40 join respective strips 42, 44. Strips 46, 48 join respective strips 50, 52. Strips 54, 56 join respective strips 58, 60. Each pair of joined strips forms a fastener.

The ends of straps 18, 21 are also connected using similar strip fasteners.

Figure 3:
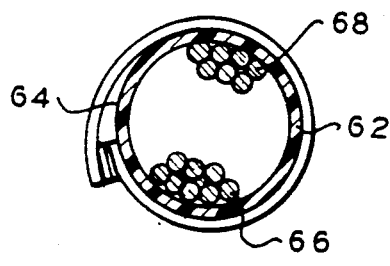
FIG. 3 is a section view as taken along line 3—3 of FIG. 2.

As shown in FIG. 3, conduit 14 has an outer wall 62, which has an outer surface 64. Wall 62 encloses a plurality of wires 66, 68. Outer surface 64 contacts blanket inner surface 22.

Figure 4:
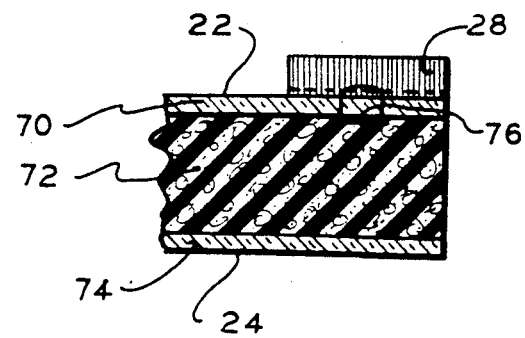
FIG. 4 is a section view as taken along line 4—4 of FIG. 1.

As shown in FIG. 4, blanket 12 has an inner fiberglass layer 70 and a middle foam rubber layer 72 and an outer fiberglass layer 74. Each strip is attached to blanket 12 by stitching, such as stitching 76. In FIG. 4, stitching 76 is shown enlarged for ease of illustration.

Figure 5:
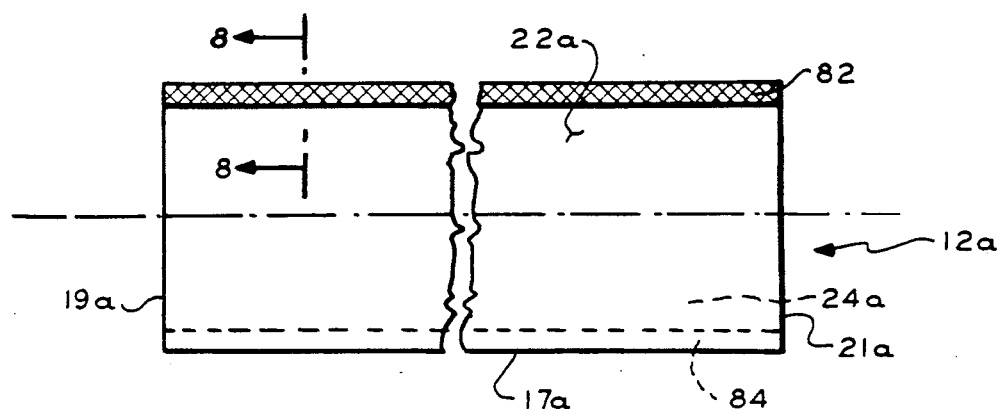
FIG. 5 developed plan view of an inner side of a second embodiment of a fire barrier blanket.
Figure 6:
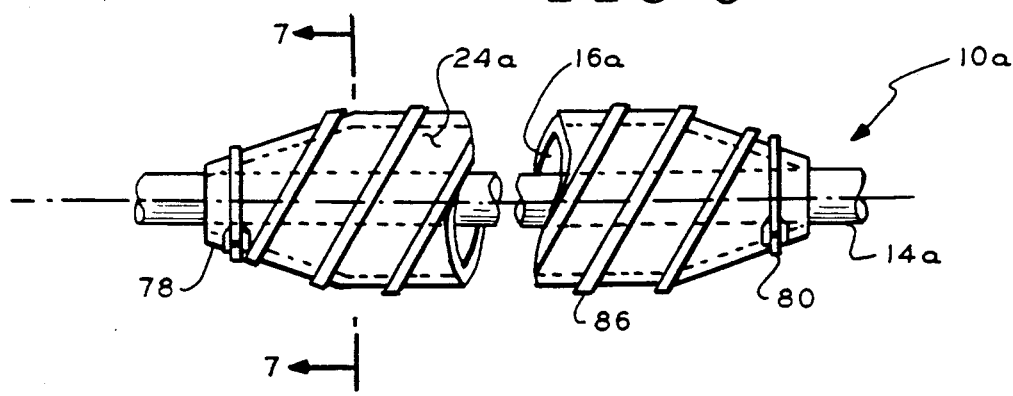
FIG. 6 is a plan view of the second fire barrier blanket wrapped around a relatively small diameter conduit splice.

As shown in FIGS. 5 and 6, a second embodiment 10a is provided. Parts of second embodiment 10a which are the same as corresponding parts of first embodiment 10 have the same numeral, but with a subscript "a" added thereto. Assembly 10a has a blanket 12a and a conduit 14a, which has a splice portion 16a. Blanket 12a also has an inner side 22a and an outer side 24a. Blanket 12a has a center portion 17a, left end 19a and right end 21a. Blanket 12a has a left pipe fastener 78 and a right pipe fastener 80. Each pipe fastener 78, 80 is a Hook and Loop type.

A shown in FIGS. 5 and 6, inner side 22a has a strip 82; and outer side 24a has a corresponding coacting strip 84. When joined, strips 82, 84 form a fastener.

Figure 7:
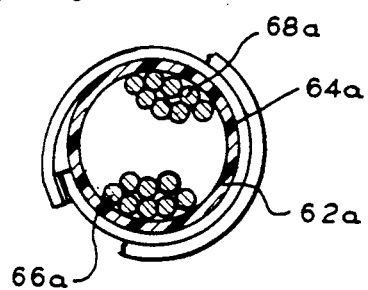
FIG. 7 is a section view as taken along line 7—7 of FIG. 6.

As shown in FIG. 7, cable 12a has an outer wall 62a, which has an outer surface 64a. Wall 62a encloses a plurality of wires 66a, 68a.

Figure 8:
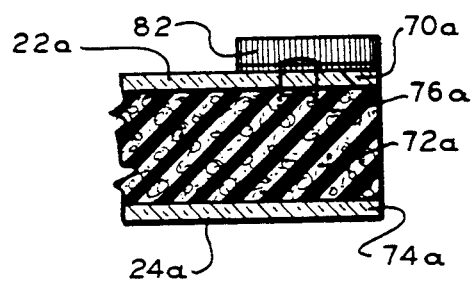
FIG. 8 is a section view as taken along line 8—8 of FIG. 5.

As shown in FIG. 8, blanket 12a has an inner fiber glass layer 70a and a middle foam rubber layer 72a and an outer fiberglass layer 74a. Strips 82, 84 are attached to blanket 12a by stitching 76a.

As shown in FIG. 6, blanket 12a is also wrapped with a diagonally wrapped tape 86.

Blanket 12a and adjacent parts thereof can withstand a flame of a temperature of two thousand degrees Farenheidt plus or minus one hundred fifty degrees Farenheidt for twenty minutes and a continuous operating temperature range of minus 40 degrees Farenheidt to plus four hundred degrees Farenheidt.

The materials used in the specified parts are indicated hereafter. Layers 70, 72, 74 are a composite of a one-sixteenth inch thick CHR F12 silicone foam with a silicone coated fabric CHR 1406 cast on each side. The silicone foam is described in U.S. Pat. No. 4,418,157 issued Nov. 29, 1983 and U.S. Pat. No. 4,189,545 issued Feb. 19, 1980. Both the fabric and foam are supplied by CHR Industries, Inc. (a division of Florcarbon, Inc.) of 407 East Street, New Haven, Conn. The silicone foam does not contain any alumina trihydrate. Strips 26 and 32, and all other like strips, are hook and loop fasteners which are composed of fire retardant nylon material and which is sold commercially under the trademarks VELCRO or HOOK AND LOOP. Straps 18, 20 are made of the same material as that of strips 26, 32. Pipe clamps 78, 80 are composed of the same material as that of strips 82, 84. Stitching is a sewing thread material which is resistant up to 1200 degrees Farenheidt temperature. Diagonal tape 86 is composed of fiberglass and has an adhesive composed of silicone.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A fire barrier blanket comprising: an elongate center portion having an elongate axis; axially spaced end portions; axially spaced clamp units for clamping the end portions; said center portion and end portions each having an inner fiberglass layer and a middle foam layer and an outer fiberglass layer; and said middle layer being a silicone foam material and said inner layer and outer layer each being a silicone coated fabric cast on the middle layer.

2. The blanket of claim 1, wherein each said clamp unit is a strap.

3. The blank of claim 1, wherein said silicone foam is a one-sixteenth inch thick layer.

4. The blanket of claim 1, wherein said center portion has parallel elongate edges having respective elongate coacting hook and loop strips.

5. The blank of claim 4, wherein said end portions each has a pair of flap portions, each said flap portion having elongate diagonal edges, adjacent edges having coacting hook and loop strips.

6. The blank of claim 5, wherein said end portions each has a frustoconical portion after assembly.

7. The blanket of claim 1, wherein said blanket can withstand a flame having a temperature up to two thousand degrees Farenheidt for twenty minutes and can withstand a continuous operating temperature range of minus forty degrees Farenheidt to plus four hundred degrees Farenheidt.

* * * * *